(12) United States Patent
Lee et al.

(10) Patent No.: US 8,331,853 B2
(45) Date of Patent: Dec. 11, 2012

(54) CONTENTS PROVIDING SYSTEM AND METHOD FOR PROVIDING DATA SERVICES THROUGH SHORT-RANGE WIRELESS COMMUNICATION NETWORK, AND CPNS SERVER AND MOBILE COMMUNICATION TERMINAL FOR THE SAME

(75) Inventors: Jeong Hoon Lee, Seoul (KR); Jeong Min You, Seoul (KR); In Hwan Kim, Seoul (KR)

(73) Assignee: SK Planet Co., Ltd. (KR)

( * ) Notice: Subject to any disclaimer, the term of this patent is extended or adjusted under 35 U.S.C. 154(b) by 98 days.

(21) Appl. No.: 13/125,609

(22) PCT Filed: Sep. 1, 2009

(86) PCT No.: PCT/KR2009/004905
§ 371 (c)(1),
(2), (4) Date: Apr. 22, 2011

(87) PCT Pub. No.: WO2010/047470
PCT Pub. Date: Apr. 29, 2010

(65) Prior Publication Data
US 2011/0201310 A1 Aug. 18, 2011

(30) Foreign Application Priority Data
Oct. 22, 2008 (KR) .................. 10-2008-0103629

(51) Int. Cl.
*H04B 7/15* (2006.01)

(52) U.S. Cl. ............... 455/11.1; 455/418; 455/414.1; 370/328

(58) Field of Classification Search .......... 455/11.1, 455/418, 414.1; 370/328
See application file for complete search history.

(56) References Cited

U.S. PATENT DOCUMENTS
6,825,830 B1 * 11/2004 Kanesaka et al. ............ 345/156
(Continued)

FOREIGN PATENT DOCUMENTS
JP 2003-308245 10/2003
(Continued)

*Primary Examiner* — Danh Le
(74) *Attorney, Agent, or Firm* — Baker & Hostetler LLP (57) ABSTRACT

The present invention relates to a contents providing system and method for providing data services through a short-range wireless communication network, and a CPNS server and a mobile communication terminal for the same. The contents providing system includes the CPNS server, the mobile communication terminal and an end-point terminal. When the end-point terminal is initially connected to the mobile communication terminal through the short-range wireless communication network, the CPNS server registers information on the end-point terminal as connection history information by matching the end-point terminal information to a corresponding mobile communication terminal. The CPNS server provides response information if either an end-point terminal information request or a contents information request is received from the mobile communication terminal. The mobile communication terminal is connected to at least any one of a plurality of adjacent end-point terminals through the short-range wireless communication network. If a contents transfer request key signal is received while a mobile WEB or WAP service is used, the mobile communication terminal transmits corresponding contents that are played back when the contents transfer request key signal is received to the end-point terminal. The end-point terminal transmits and receives information to and from the mobile communication terminal through the short-range wireless communication network. Therefore, the present invention is effective in that an end-point terminal that does not have a communication function can be provided with specific contents requested by a user while a mobile WEB or WAP service is used on a mobile communication terminal.

21 Claims, 6 Drawing Sheets

U.S. PATENT DOCUMENTS

| | | | |
|---|---|---|---|
| 2007/0049270 A1* | 3/2007 | Sawada | 455/432.1 |
| 2007/0065107 A1* | 3/2007 | Ryu et al. | 386/95 |
| 2009/0267867 A1* | 10/2009 | Gonia | 345/1.1 |
| 2010/0026816 A1* | 2/2010 | Bergstrom et al. | 348/207.11 |
| 2010/0062770 A1* | 3/2010 | Flynn et al. | 455/436 |
| 2011/0002260 A1* | 1/2011 | Kim | 370/328 |

FOREIGN PATENT DOCUMENTS

| | | |
|---|---|---|
| KR | 1020060038679 | 5/2006 |
| WO | 2005/053304 | 6/2005 |

* cited by examiner

CONTENTS PROVIDING SYSTEM AND METHOD FOR PROVIDING DATA SERVICES THROUGH SHORT-RANGE WIRELESS COMMUNICATION NETWORK, AND CPNS SERVER AND MOBILE COMMUNICATION TERMINAL FOR THE SAME

BACKGROUND OF THE INVENTION

1. Field of the Invention

The present invention relates to a contents providing system and method for providing data services through a short-range wireless communication network, and a CPNS server and a mobile communication terminal for the same, and more specifically, to a contents providing system and method for providing data services through a short-range wireless communication network, and a CPNS server and a mobile communication terminal for the same, in which an end-point terminal is provided with corresponding contents through the short-range wireless communication network while mobile WEB or WAP service is used on the mobile communication terminal.

2. Background of the Related Art

With advancement of information communication technologies, a variety of end-point terminals that can play back documents, images and moving pictures, such as MPeg audio layer-3 (MP3) players, Personal Multimedia Players (PMP) and Ultra Mobile Personal Computers (UMPC), is widely used.

A user downloads desired contents from personal computers (PC) and plays back the downloaded contents. However, such an end-point terminal has a problem in that the user cannot download desired contents when the user is moving or cannot connect to a PC.

In order to solve the problem, techniques for adding a communication means capable of connecting to a short-range wireless communication network to the end-point terminals, such as Bluetooth and ultra-wideband (UWB), have been proposed.

According to the techniques, it is possible to download contents from external devices through a short-range wireless communication network. However, there is a problem in that although these methods can be used to download the contents stored in the external devices, contents desired by the user, but not stored in the external devices, cannot be downloaded.

Furthermore, although short-range wireless communications are used, the user cannot be directly provided with contents or services that the mobile communication terminal has received from service providers or mobile communication companies through conventional cellular communications.

SUMMARY OF THE INVENTION

Therefore, in order to solve the above problems, a CPNS technique is proposed, in which an end-point terminal such as a PMP or the like is connected to a mobile communication terminal through short-range wireless communications and provided with desired services by accessing a conventional contents service provider through cellular communication functions of the mobile communication terminal.

On the other hand, when a user desires to provide the end-point terminal with corresponding contents while using a mobile WEB or WAP service through the mobile communication terminal, the user frequently feels inconvenience since a relevant technique is not provided.

The present invention has been made in view of the problem, and there is provided a contents providing system and method for providing data services through a short-range wireless communication network, and a CPNS server for the same, in which an end-point terminal is provided with specific contents requested by a user while a mobile WEB or WAP service is used on a mobile communication terminal.

In addition, an object of the invention is to provide a mobile communication terminal for providing a data service used on the mobile communication terminal to an end-point terminal through a short-range wireless communication network with only a few simple key handlings.

To accomplish the above object, according to one aspect of the present invention, there is provided a mobile communication terminal connected to a CPNS server and an end-point terminal through a short-range wireless communication network, for transferring contents to the end-point terminal while a mobile WEB or WAP service is used, in which the CPNS server controls a connection established between the mobile communication terminal and the end-point terminal through short-range wireless communications, and the end-point terminal plays back the contents provided from the mobile communication terminal through short-range wireless communications, the mobile communication terminal comprising: a contents transfer request key signal recognizing unit for recognizing a key selection as a request for transferring currently played back contents to the end-point terminal through the short-range wireless communication network while the mobile WEB or WAP service is used, and performing subsequent actions, if a user selects a contents transfer request key; an end-point terminal management unit for requesting and receiving a list of end-point terminals that can be connected to the mobile communication terminal from the CPNS server, or extracting a list of previously stored end-point terminals that can be connected to the mobile communication terminal, and providing the end-point terminal list so that the user may recognize; a contents management unit for requesting and receiving contents that are played back at a time point of generating a contents transfer request from the CPNS server; and a contents transmission unit for transmitting the contents received by the contents management unit to an end-point terminal selected by the user from the end-point terminal list.

If the contents are stored in the mobile communication terminal, the contents management unit preferably extracts the previously stored contents and transmits the extracted contents to the end-point terminal selected by the user through the contents transmission unit.

The contents transfer request key is preferably a special key provided on the mobile communication terminal or a specific key on a keypad.

According to another aspect of the present invention, there is provided a contents providing system for providing data services through a short-range wireless communication network, the system comprising: a CPNS server for registering information on an end-point terminal as connection history information by matching the end-point terminal information to a corresponding mobile communication terminal when the end-point terminal is initially connected to the mobile communication terminal through the short-range wireless communication network, and providing response information if either an end-point terminal information request or a contents information request is received from the mobile communication terminal; the mobile communication terminal connected to at least any one of a plurality of adjacent end-point terminals through the short-range wireless communication network, for transmitting corresponding contents that are played back when a contents transfer request key signal is received to the end-point terminal, if the contents transfer request key signal is received while a mobile WEB or WAP service is used; and an end-point terminal for transmitting and receiving information to and from the mobile communication terminal through the short-range wireless communication network.

The contents providing system preferably further comprises a contents providing server for transforming a contents format based on a specification of the end-point terminal transmitted together with a contents request and transmitting the transformed contents to the CPNS server, or transmitting corresponding contents to the mobile communication terminal using a mobile communication terminal number matching to the end-point terminal after acquiring the mobile communication terminal number from the CPNS server, if the contents request is received from the CPNS server.

The end-point terminal preferably includes: a communication interface unit for communicating with the short-range wireless communication network; an input unit for receiving a corresponding signal depending on a user's selection; a contents request and receive unit for requesting specific contents from the mobile communication terminal and receiving corresponding contents through the communication interface unit; a playback unit for playing back the received contents; and a storage unit for storing information related to the end-point terminal.

According to another aspect of the present invention, there is provided a CPNS server comprising: a communication interface unit for communicating with a mobile communication network; a mobile communication terminal information management unit for registering and managing information on the mobile communication terminal communicating with an end-point terminal through the short-range wireless communication network in a database; an end-point terminal information management unit for registering and managing information on the end-point terminal transmitting and receiving information to and from the mobile communication terminal through the short-range wireless communication network in the database; a history information management unit for collecting information on a connection established between the mobile communication terminal and the end-point terminal and storing and managing the collected information in the database as connection history information; a contents request and provide unit for requesting and receiving corresponding contents from a contents providing server based on contents identification information transmitted together with a contents request, if the contents request is received from the mobile communication terminal; an end-point terminal information providing unit for extracting and providing a list of end-point terminals that can be connected to the mobile communication terminal from the database in response to a request received from the mobile communication terminal; and the database for storing information related to the CPNS server including the mobile communication terminal information and the end-point terminal information.

When the contents request and provide unit requests contents from the contents providing server, the contents request and provide unit preferably provides hardware and software specifications of the end-point terminal together with a contents name so that the contents can be selectively provided in a format that can be played back and displayed on the end-point terminal or the contents can be transformed into a format that can be played back and displayed.

The information on the mobile communication terminal preferably includes information required to communicate with the end-point terminal, such as an agreement state indicating whether or not to transmit and receive information to and from the end-point terminal through the short-range wireless communication network, a list of provided services, and a list of connected end-point terminals, and the information on the end-point terminal preferably includes information required to provide the contents through the short-range wireless communication network, such as hardware and software specifications.

According to another aspect of the present invention, there is provided a method for transferring contents to an end-point terminal in a contents providing system including a CPNS server, a mobile communication terminal and an end-point terminal, in which the contents are transferred to the end-point terminal while a mobile WEB or WAP service is used, the method comprising the steps of: a) allowing the mobile communication terminal to recognize a key selection as a request for transferring the contents and request a list of end-point terminals that can be connected to the mobile communication terminal from the CPNS server, if a contents transfer request key is selected while the mobile WEB or WAP service is used; b) allowing the CPNS server to extract and transmit the end-point terminals that can be connected to the mobile communication terminal from previously stored information, in response to a contents and end-point terminal list request transmitted from the mobile communication terminal; c) allowing the CPNS server to request corresponding contents from the contents providing server by transmitting a contents transfer request together with information on a specification of the corresponding end-point terminal, if information on an end-point terminal selected by a user from the end-point terminal list is received from the mobile communication terminal; and d) allowing the contents providing server to transmit contents that can be played back on the end-point terminal to the CPNS server considering the specification of the end-point terminal transmitted together with the contents request, or transmit corresponding contents to the mobile communication terminal using a mobile communication terminal number matching to the end-point terminal after acquiring the mobile communication terminal number from the CPNS server, if the contents request is received from the CPNS server.

The method for transferring contents preferably further comprises the step of, before step a), allowing the CPNS server to register information on the end-point terminal as connection history information by matching the end-point terminal information with the corresponding mobile communication terminal, when the end-point terminal is initially connected to the mobile communication through the short-range wireless communication network.

The method for transferring contents preferably further comprises the step of, after step d), allowing the CPNS server to receive a contents reception confirmation message transmitted from the end-point terminal through the mobile communication terminal, when the mobile communication terminal transmits the contents received from the CPNS server to the end-point terminal.

According to another aspect of the present invention, there is provided a method for transferring contents to an end-point terminal in response to a request received from a mobile communication terminal, in which a CPNS server connected to the mobile communication terminal and a contents providing server transfers the contents to the end-point terminal while a mobile WEB or WAP service is used, the method comprising the steps of: a) allowing the CPNS server to register information on the end-point terminal as connection history information by matching the end-point terminal information with the corresponding mobile communication terminal, when the end-point terminal is initially connected to the mobile communication through the short-range wireless communication network; b) allowing the CPNS server to extract and transmit end-point terminals that can be connected to the mobile communication terminal from previously stored information, in response to a contents transfer request received from the mobile communication terminal; c) allowing the CPNS server to request corresponding contents from the contents providing server, if information on an end-point terminal selected by a user from the end-point terminal list is received from the mobile communication terminal; and d) allowing the CPNS server to transmit the contents to a corresponding mobile communication terminal, if the contents are received from the contents providing server.

The method for transferring contents by the CPNS server preferably further comprises the step of, after step a), collecting information on a connection established between the mobile communication terminal and the end-point terminal and additionally registering the collected connection information in the connection history information.

In step a), the CPNS server preferably registers information on the mobile communication terminal required to communicate with the end-point terminal, such as an agreement state indicating whether or not to transmit and receive information to and from the end-point terminal through the short-range wireless communication network, a list of provided services, and a list of connected end-point terminals, and information on the end-point terminal required to provide the contents through the short-range wireless communication network, such as hardware and software specifications.

In step c), the CPNS server preferably transmits hardware and software specifications of the end-point terminal together with a contents name so that the contents can be selectively provided in a format that can be played back and displayed on the end-point terminal or the contents can be transformed into a format that can be played back and displayed.

The method for transferring contents by the CPNS server preferably further comprises the step of, after step d), allowing the CPNS server to receive a contents reception confirmation message transmitted from the end-point terminal through the mobile communication terminal, when the mobile communication terminal transmits the contents received from the CPNS server to the end-point terminal.

According to another aspect of the present invention, there is provided a method for transferring contents to an end-point terminal, in which a mobile communication terminal connected to a CPNS server and the end-point terminal transfers the contents to the end-point terminal while a mobile WEB or WAP service is used, the method comprising the steps of: a) recognizing a key selection as a request for transferring the contents, if a contents transfer request key is selected while the mobile communication terminal uses the mobile WEB or WAP service; b) requesting and receiving a list of end-point terminals that can be connected to the mobile communication terminal from the CPNS server, or extracting a list of previously stored end-point terminals that can be connected to the mobile communication terminal, and outputting the end-point terminal list on a screen so that a user may recognize; and c) connecting to the end-point terminal selected by the user from the end-point terminal list and transmitting contents that are played back when the contents transfer request key is inputted.

The method for transferring contents by the mobile communication terminal preferably further comprises the step of, before step c), requesting and receiving the contents from the CPNS server, if the mobile communication terminal requests the contents from the CPNS server.

It is preferable that if the contents are stored in the mobile communication terminal, the mobile communication terminal extracts contents that are played back when the contents transfer request key is inputted from previously stored information and transmits the extracted contents to the end-point terminal selected by the user, in step c).

DETAILED DESCRIPTION OF THE PREFERRED EMBODIMENT

The converged personal network service (CPNS) disclosed in the present invention allows a portable terminal that can perform only short-range wireless communications, but cannot perform cellular communications with a mobile communication network, to use data services provided through cellular communications by performing short-range wireless communications with a mobile communication terminal that functions as a personal network service (PN) gateway.

In addition, <mobile WEB or WAP service> and <data service> disclosed in the present invention mean all kinds of services provided through cellular communications, and although they are expressed in different terms, the same meaning will be applied to both of the services.

The preferred embodiments of the invention will be hereafter described in detail, with reference to the accompanying drawings.

Figure 1:
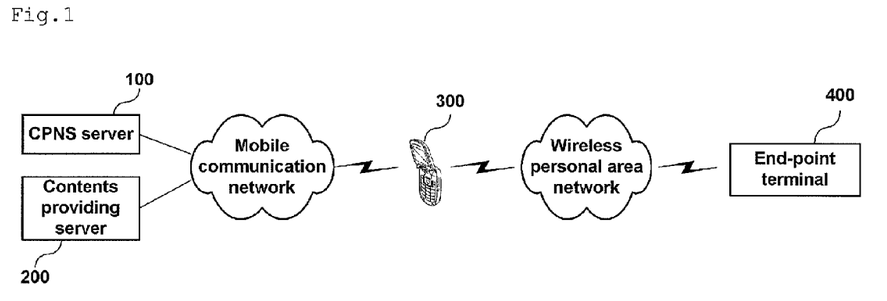
FIG. 1 is a view showing a connection relation between a contents providing system and a communication network according to the invention.

First, FIG. 1 is a view showing a connection relation between a contents providing system and a communication network according to the invention.

As shown in FIG. 1, the contents providing system comprises a CPNS server for registering information on an end-point terminal as connection history information by matching the end-point terminal information to a corresponding mobile communication terminal when the end-point terminal is initially connected to the mobile communication terminal through a short-range wireless communication network, and providing response information if either an end-point terminal information request or a contents information request is received from the mobile communication terminal; the mobile communication terminal connected to at least any one of a plurality of adjacent end-point terminals through the short-range wireless communication network, for transmitting corresponding contents that are played back when a contents transfer request key signal is received to the end-point terminal, if the contents transfer request key signal is received while a mobile WEB or WAP service is used; and an end-point terminal for transmitting and receiving information to and from the mobile communication terminal through the short-range wireless communication network.

In addition, the contents providing system further comprises a contents providing server 200. If a contents request is received from the CPNS server 100, the contents providing server 200 transmits contents that can be played back on the end-point terminal to the CPNS server or transmits corresponding contents to the mobile communication terminal using a mobile communication terminal number matching to the end-point terminal after acquiring the mobile communication terminal number from the CPNS server, considering the specification of the end-point terminal transmitted together with the contents request.

Here, the contents transfer request is issued when a user selects a special key provided on the mobile communication terminal or a specific key on a keypad.

The end-point terminal 400 shown in FIG. 1 is a portable terminal having a short-range wireless communication function, such as a PMP, an MP3 player, a navigation terminal of a vehicle, a cellular phone, a game console or the like.

On the other hand, the short-range wireless communication network includes all kinds of communication networks capable of short-range wireless communications, such as a wireless LAN, a Bluetooth, a UWB, a wireless personal area network (WPAN) and the like.

The CPNS server 100, the mobile communication terminal 300 and the end-point terminal 400 shown in FIG. 1 go through an initial setup process for CPNS services, which will be described below in detail.

Figure 2:
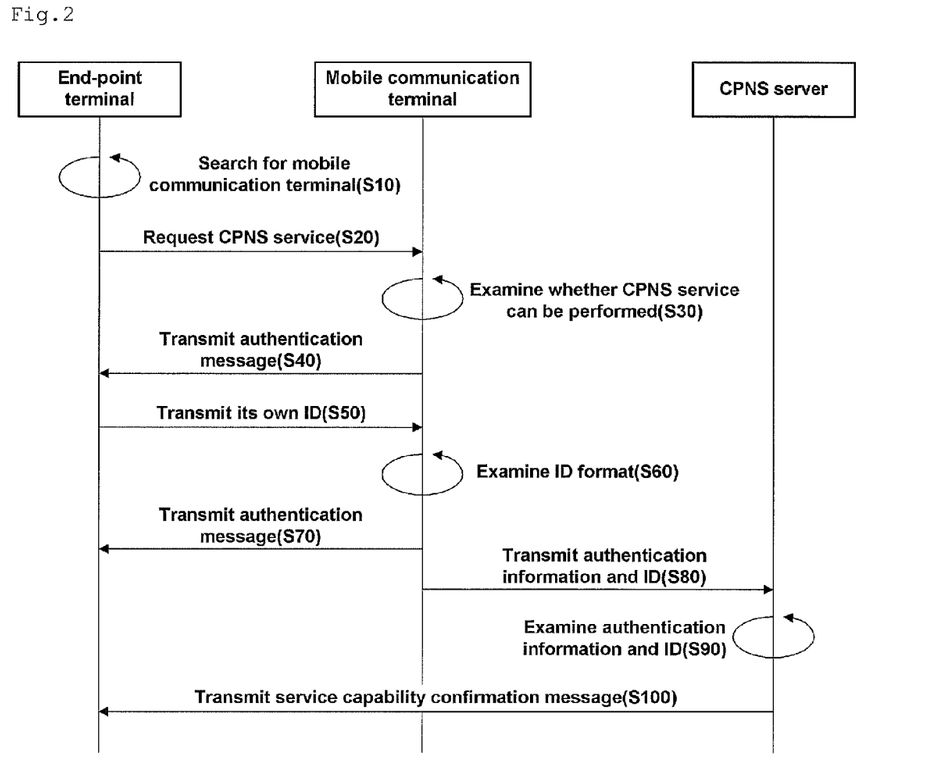
FIG. 2 is a sequence diagram illustrating an initial setup method for CPNS services according to the invention.

FIG. 2 is a sequence diagram illustrating an initial setup method for CPNS services according to the invention.

First, the end-point terminal 400 searches for a mobile communication terminal that will function as a PN gateway device in order to use CPNS services S10.

Next, the end-point terminal 400 requests a service to the mobile communication terminal 300 searched in step S10. Here, the end-point terminal also transmits information about the device capabilities of that end-point terminal to be provided suitable CPNS services S20.

Next, if the mobile communication terminal 300 receives a request for services transmitted from to the end-point terminal, the mobile communication terminal 300 examines whether the end-point terminal have the CPNS platform or application which can render the CPNS services S30.

If the end-point terminal can perform CPNS services as a result of examination in step S30, the mobile communication terminal 300 transmits an authentication message confirming that the CPNS services can be provided, to the end-point terminal 400 S40.

If the authentication message confirming that the CPNS services can be performed is received from the mobile communication terminal, the end-point terminal 400 transmits its identification (ID) S50.

The mobile communication terminal 300 examines whether or not the format of the ID transmitted from the end-point terminal 400 matches to an ID format issued by the CPNS, and if the ID formats are matched, the mobile communication terminal 300 transmits an authentication message confirming that CPNS services can be provided, to the end-point terminal 400 S60 and S70.

Next, the mobile communication terminal 300 transmits authentication information and IDs of its own and the end-point terminal 400 to the CPNS server 100 S80.

The CPNS server 100 examines the authentication information and IDs transmitted from the mobile communication terminal 300 and determines whether or not the CPNS services can be provided for the mobile communication terminal 300 and the end-point terminal 400 S90.

If the CPNS services can be provided for both of the mobile communication terminal 300 and the end-point terminal 400, the CPNS server 100 informs the end-point terminal 400 of the fact so that the end-point terminal 400 can use thereafter the CPNS services including a contents request S100.

If the CPNS services can be provided for either of the mobile communication terminal 300 and the end-point terminal 400, the CPNS server 100 informs the end-point terminal 400 of the fact and terminates the service.

On the other hand, if the end-point terminal cannot perform the CPNS services as a result of examination in step S30, the mobile communication terminal 300 transmits a message informing that the CPNS services cannot be provided to the end-point terminal 400 and terminates the service.

On the other hand, if the ID format of the end-point terminal is not matched as a result of examination in step S60, the mobile communication terminal 300 transmits a message informing that the CPNS services cannot be provided to the end-point terminal 400 and terminates the service.

The CPNS server 100 described above stores information on the end-point terminal, including information on the specification (e.g., an LCD size, information on codec, etc) of the end-point terminal 400 provided with CPNS services through short-range wireless communications with the mobile communication terminal 300, and information on the mobile communication terminal 300, and refers to the information when providing the CPNS services.

For example, when the CPNS server 100 requests contents from the contents providing server 200, the CPNS server 100 requests the contents based on the specification of the end-point terminal 400 or the mobile communication terminal 300.

Figure 3:
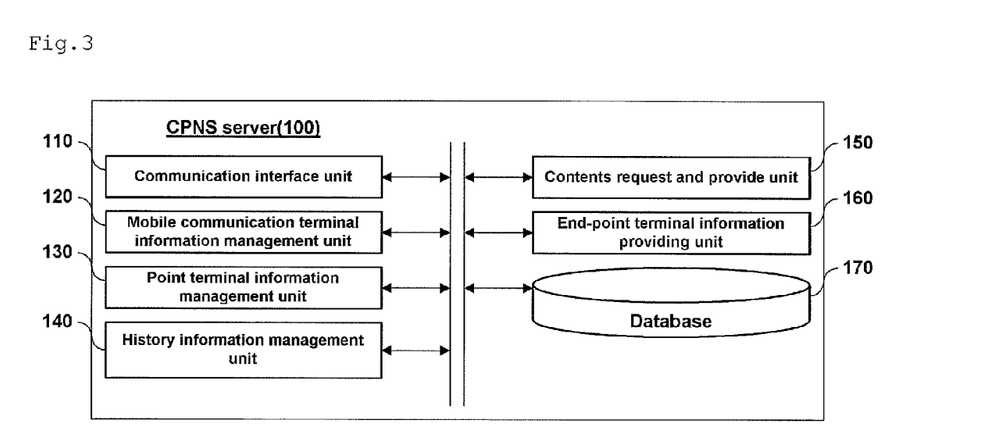
FIG. 3 is a view showing the configuration of a CPNS server according to the invention.

FIG. 3 is a view showing the configuration of a CPNS server according to the invention.

As shown in FIG. 3, the CPNS server 100 includes a communication interface unit 110, a mobile communication terminal information management unit 120, an end-point terminal information management unit 130, a history information management unit 140, a contents request and provide unit 150, an end-point terminal information providing unit 160, and a database 170.

Describing in further detail, the communication interface unit 110 is a constitutional component for communicating with a mobile communication network.

The mobile communication terminal information management unit 120 registers and manages information on the mobile communication terminal communicating with the end-point terminal 400 through a short-range wireless communication network in the database 170.

Here, the information on the mobile communication terminal includes information required to communicate with the end-point terminal, such as an agreement state indicating whether or not to transmit and receive information to and from the end-point terminal through the short-range wireless communication network, a list of provided services, and a list of connected end-point terminals.

The end-point terminal information management unit 130 registers and manages information on the end-point terminal transmitting and receiving information to and from the mobile communication terminal 300 through the short-range wireless communication network in the database 170.

Here, the information on the end-point terminal includes information required to provide the contents through the short-range wireless communication network, such as hardware and software specifications.

The history information management unit 140 collects information on a connection established between the mobile communication terminal 300 and the end-point terminal 400, and stores and manages the collected information in the database as connection history information 170.

If a contents request is received from the mobile communication terminal 300, the contents request and provide unit 150 requests and receives corresponding contents from the contents providing server based on contents identification information transmitted together with the contents request.

Here, when the contents request and provide unit 150 requests contents from the contents providing server 200, the contents request and provide unit 150 provides hardware and software specifications of the end-point terminal together with a contents name so that the contents can be selectively provided in a format that can be played back and displayed on the end-point terminal 400 or the contents can be transformed into a format that can be played back and displayed.

The end-point terminal information providing unit 160 extracts and provides a list of end-point terminals that can be connected to the mobile communication terminal from the database 170 in response to a request received from the mobile communication terminal 300.

The database 170 stores information related to the CPNS server including the mobile communication terminal information and the end-point terminal information.

Figure 4:
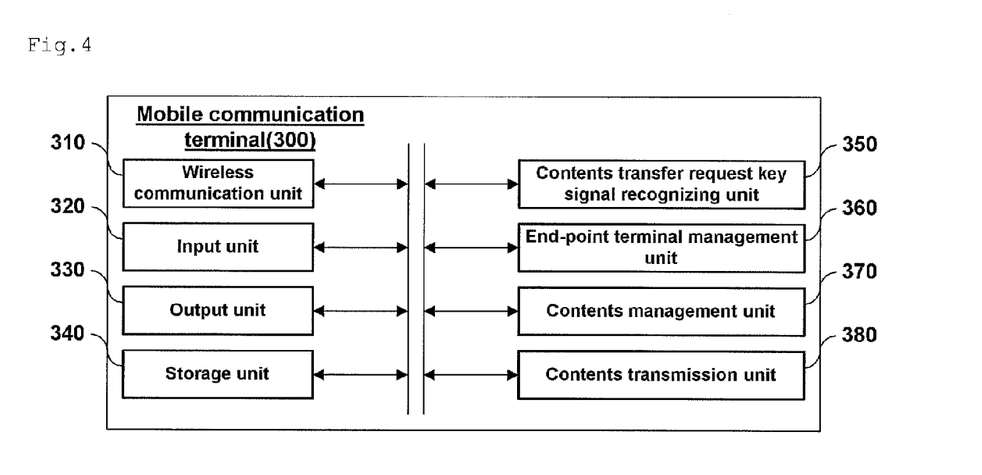
FIG. 4 is a view showing the configuration of a mobile communication terminal according to the invention.

FIG. 4 is a view showing the configuration of a mobile communication terminal according to the invention. In the example described below, the mobile communication terminal is connected to the CPNS server and the end-point terminal through a wireless communication network and transfers contents to the end-point terminal while a mobile WEB or WAP service is used. The CPNS server controls a connection established between the mobile communication terminal and the end-point terminal through short-range wireless communications, and the end-point terminal plays back contents provided from the mobile communication terminal through short-range wireless communications.

As shown in FIG. 4, the mobile communication terminal 300 includes a wireless communication unit 310, an input unit 320, an output unit 330, a storage unit 340, a contents transfer request key signal recognizing unit 350, an end-point terminal management unit 360, a contents management unit 370, and a contents transmission unit 380.

The wireless communication unit 310 for performing wireless communications with short-range wireless communication networks or mobile communication networks, the input unit 320 for controlling inputs, the output unit 330 for providing data needed for using voice communication services or data services in a video or audio form, and the storage unit 340 for storing various types of data included in the mobile communication terminal 300 have a general configuration of a mobile communication terminal, and thus they will not be described in detail.

If a user selects a contents transfer request key, the contents transfer request key signal recognizing unit 350 recognizes the key selection as a request for transferring currently played back contents to the end-point terminal through the short-range wireless communication network while a mobile WEB or WAP service is used, and performs subsequent actions.

Here, the contents transfer request key is a special key provided on the mobile communication terminal or a specific key on a keypad.

The end-point terminal management unit 360 requests and receives a list of end-point terminals that can be connected to the mobile communication terminal from the CPNS server 100, or extracts a list of previously stored end-point terminals that can be connected to the mobile communication terminal, and provides the end-point terminal list so that the user may recognize.

The contents management unit 370 requests and receives contents that are played back at the time point of generating a contents transfer request from the CPNS server 100.

If the contents are stored in the mobile communication terminal, the contents management unit 370 extracts the previously stored contents and transmits the extracted contents to an end-point terminal 400 selected by the user through the contents transmission unit 380.

For example, contents information used through a mobile WEB or WAP service is downloaded and stored in the mobile communication terminal, or contents information the same as the downloaded one is previously stored in the mobile communication terminal, or the size of contents information is comparatively small like an MP3 sound source and thus contents can be easily transferred to the end-point terminal 400.

The contents transmission unit 380 transmits the contents received by the contents management unit 370 to an end-point terminal 400 selected by the user from the end-point terminal list displayed on the screen by the end-point terminal management unit 360.

Figure 5:
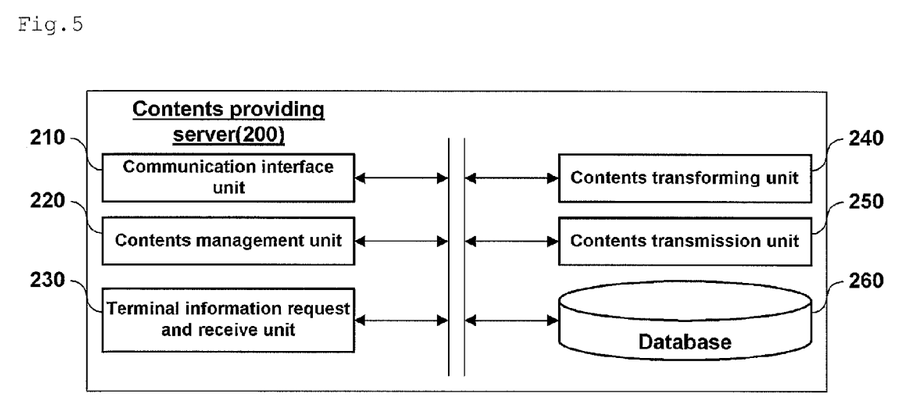
FIG. 5 is a view showing the configuration of a contents providing server according to the invention.

FIG. 5 is a view showing the configuration of a contents providing server according to the invention.

As shown in FIG. 5, the contents providing server 200 includes a communication interface unit 210 for communicating with a mobile communication network, a contents management unit 220 for storing and managing a variety of contents in a database, a terminal information request and receive unit 230 for requesting and receiving information on a terminal (e.g., an end-point terminal) that will play back the contents from the CPNS server 100, a contents transforming unit 240 for transforming a contents format based on the specification of the end-point terminal transmitted together with a contents transmission request if the contents transmission request is received from the CPNS server 100, a contents transmission unit 250 for transmitting the contents transformed by the contents transforming unit 240 or contents extracted considering the specification of the end-point terminal to the CPNS server or the mobile communication terminal using a mobile communication terminal number matching to the end-point terminal after acquiring the mobile communication terminal number from the CPNS server, and a database 260 for storing information related to the contents providing server including contents information.

Figure 6:
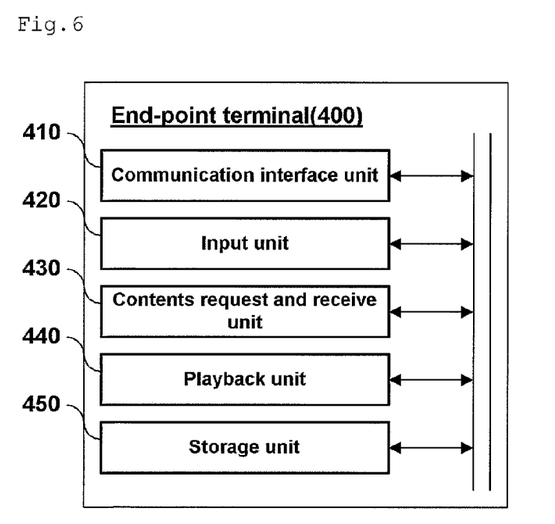
FIG. 6 is a view showing the configuration of an end-point terminal according to the invention.

FIG. 6 is a view showing the configuration of an end-point terminal according to the invention.

As shown in FIG. 6, the end-point terminal 400 includes a communication interface unit 410, an input unit 420, a contents request and receive unit 430, a playback unit 440, and a storage unit 450.

Describing in further detail, the communication interface unit 410 is a constitutional component for communicating with a short-range wireless communication network.

The input unit 420 receives a corresponding signal depending on a user's selection.

The contents request and receive unit 430 requests specific contents from the mobile communication terminal 300 and receives corresponding contents through the communication interface unit 410.

The playback unit 440 plays back the received contents.

The storage unit 450 stores information related to the end-point terminal.

Figure 7:
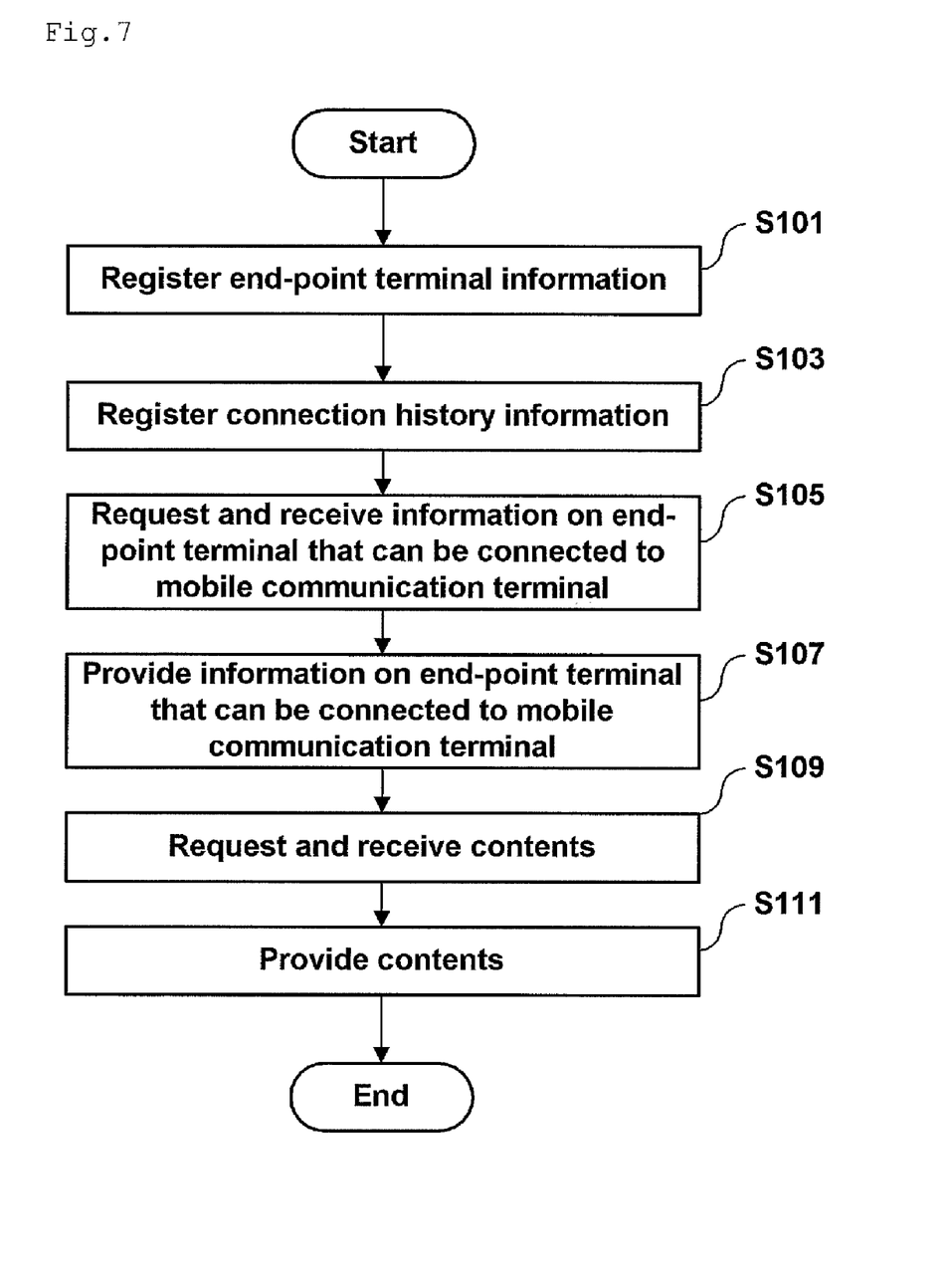
FIG. 7 is a flowchart illustrating an example of a method for providing contents according to the invention.

FIG. 7 is a flowchart illustrating an example of a method for providing contents according to the invention. In the example described below, the CPNS server transfers contents of a mobile WEB or WAP page to the end-point terminal in response to a request received from the mobile communication terminal.

First, when the end-point terminal 400 is initially connected to the mobile communication terminal 300 through the short-range wireless communication network, the CPNS server 100 registers information on the end-point terminal in the database 170 as connection history information by matching the end-point terminal information with the corresponding mobile communication terminal S101 and S103.

Here, the CPNS server 100 registers information on the mobile communication terminal required to communicate with the end-point terminal, such as an agreement state indicating whether or not to transmit and receive information to and from the end-point terminal through the short-range wireless communication network, a list of provided services, and a list of connected end-point terminals, and information on the end-point terminal required to provide the contents through the short-range wireless communication network, such as hardware and software specifications.

Next, the CPNS server 100 updates existing history information by storing a connection established between the mobile communication terminal 300 and the end-point terminal 400 as connection history information whenever the connection is recognized. That is, the CPNS server 100 collects information on the connection established between the mobile communication terminal and the end-point terminal in real-time and additionally registers the collected connection information in the connection history information.

The CPNS server 100 extracts and transmits a list of end-point terminals that can be connected to the mobile communication terminal 300 from the information previously stored in the database 170 in response to a contents transfer request transmitted from the mobile communication terminal 300 S105 and S107.

Next, if information on an end-point terminal selected by a user from an end-point terminal list is received from the mobile communication terminal 300, the CPNS server 100 requests corresponding contents from the contents providing server 200 by transmitting a contents request together with information on the specification of the corresponding end-point terminal.

Here, the CPNS server 100 transmits hardware and software specifications of the end-point terminal together with a contents name so that the contents can be selectively provided in a format that can be played back and displayed on the end-point terminal or the contents can be transformed into a format that can be played back and displayed.

If the contents are received from the contents providing server 200, the CPNS server 100 transmits the contents to the corresponding mobile communication terminal 300 S109 and S111.

Although it is not shown in the figure, as the mobile communication terminal 300 transmits the contents received from the CPNS server 100 to the end-point terminal 400, the CPNS server 100 receives a contents reception confirmation message (an acknowledgement message) transmitted from the end-point terminal 400 through the mobile communication terminal 300.

Figure 8:
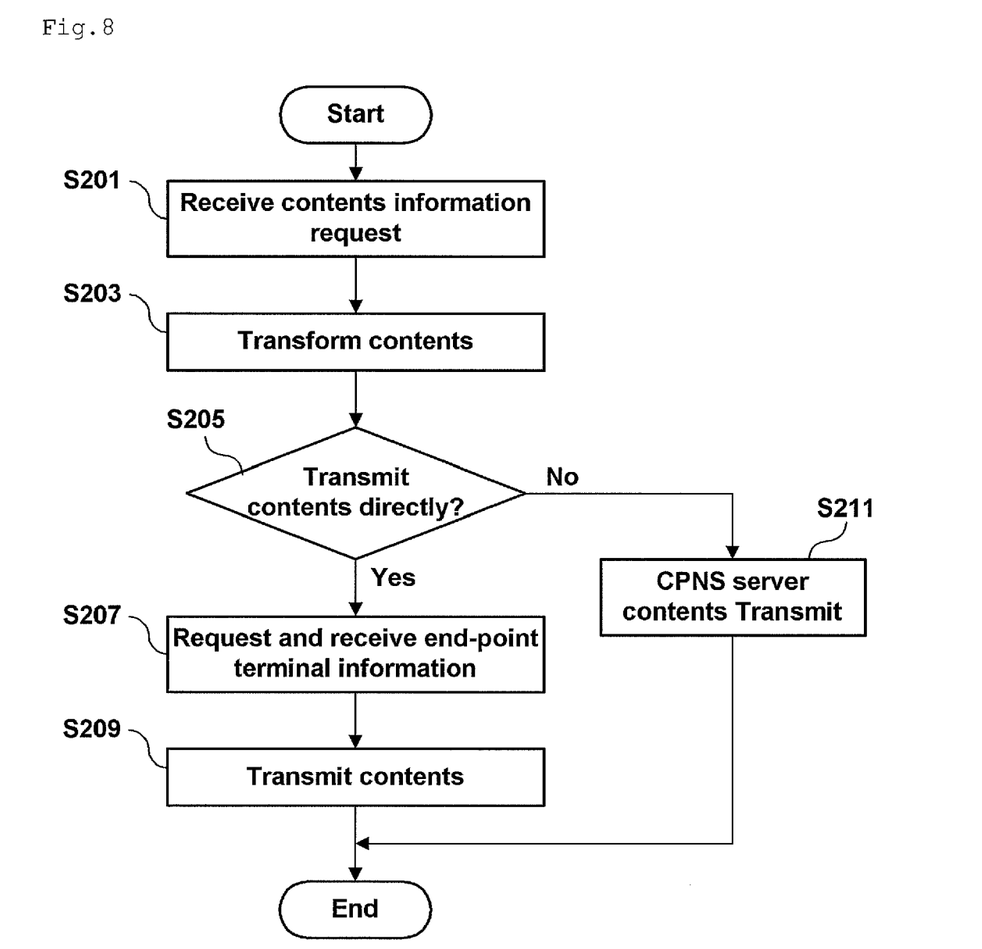
FIG. 8 is a flowchart illustrating another example of a method for providing contents according to the invention.

FIG. 8 is a flowchart illustrating another example of a method for providing contents according to the invention.

If a contents transmission request is received from the CPNS server 100 S201, the contents providing server 200 transforms a contents format based on the specification of the end-point terminal transmitted together with the contents transmission request S203 and determines whether to transmit the transformed contents directly to the mobile communication terminal 300 or to the CPNS server 100 S205.

If the contents are transmitted directly to the mobile communication terminal 300 as a result of determination in step S205, the contents providing server 200 requests and receives a mobile communication terminal number matching to the end-point terminal from the CPNS server 100 S207 and transmits the contents to the corresponding mobile communication terminal 300 using the mobile communication terminal number S209.

On the other hand, if the contents are transmitted to the CPNS server 100 as a result of determination in step S205, the contents providing server 200 transmits the transformed contents to the CPNS server 100 S211.

Figure 9:
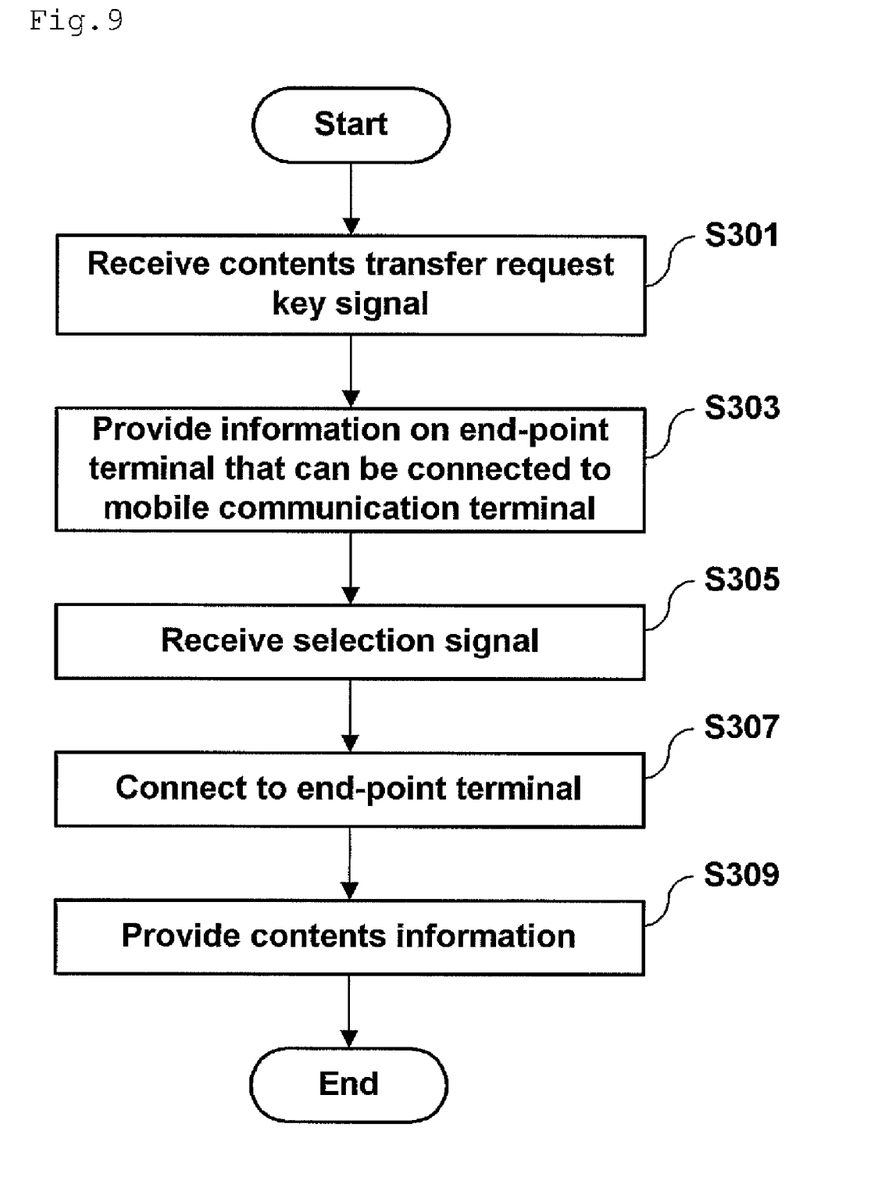
FIG. 9 is a flowchart illustrating still another example of a method for providing contents according to the invention.

FIG. 9 is a flowchart illustrating still another example of a method for providing contents according to the invention. In the example described below, the mobile communication terminal connected to the CPNS server and the end-point terminal transfers contents to the end-point terminal while a mobile WEB or WAP service is used.

First, if a contents transfer request key is selected while a mobile WEB or WAP service is used, the mobile communication terminal 300 recognizes the key selection as a request for transferring contents S301.

The mobile communication terminal 300 requests and receives a list of end-point terminals that can be connected to the mobile communication terminal from the CPNS server 100, or extracts a list of previously stored end-point terminals that can be connected to the mobile communication terminal, and outputs the end-point terminal list on the screen so that the user can recognize S303.

When the end-point terminal list is requested from the CPNS server in step S303, and if the contents transfer request key is selected while a mobile WEB or WAP service is used, the mobile communication terminal 300 recognizes the key selection as a request for transferring contents and requests a list of end-point terminals that can be connected to the mobile communication terminal from the CPNS server 100.

Next, the mobile communication terminal 300 connects to the end-point terminal selected by a user from the end-point terminal list and transmits contents that are played back when the contents transfer request key is inputted S305 to S309.

On the other hand, when the mobile communication terminal 300 requests contents from the CPNS server 100, the mobile communication terminal 300 requests and receives the contents from the CPNS server 100 before step S307.

On the other hand, if the mobile communication terminal 300 stores the contents, the mobile communication terminal 300 extracts the contents that are played back when the contents transfer request key is inputted from previously stored information and transmits the extracted contents to the end-point terminal 400 selected by the user, in step S309.

As described above, the contents providing system and method for providing data services through a short-range wireless communication network, and the CPNS server for the same according to the present invention are effective in that an end-point terminal that does not have a communication function can be provided with specific contents requested by a user while a mobile WEB or WAP service is used on a mobile communication terminal.

Furthermore, the mobile communication terminal according to the present invention is advantageous in that a data service used on the mobile communication terminal can be provided to an end-point terminal through a short-range wireless communication network with only a few simple key handlings.

As described above, the contents providing system and method for providing data services through a short-range wireless communication network, and the CPNS server and the mobile communication terminal for the same according to the present invention can be applied when specific contents requested by a user need to be provided to an end-point terminal that does not have a communication function while a mobile WEB or WAP service is used on a mobile communication terminal.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A mobile communication terminal connected to a Converged Personal Network Service (CPNS) server and an end-point terminal through a short-range wireless communication network, for transferring contents to the end-point terminal while a mobile World Wide Web (WEB) or Wireless Application Protocol (WAP) service is used, in which the CPNS server controls a connection established between the mobile communication terminal and the end-point terminal through short-range wireless communications, and the end-point terminal plays back the contents provided from the mobile communication terminal through short-range wireless communications, the mobile communication terminal comprising:
   a contents transfer request key signal recognizing unit for recognizing a key selection as a request for transferring currently played back contents to the end-point terminal through the short-range wireless communication network while the mobile WEB or WAP service is used, and performing subsequent actions, if a user selects a contents transfer request key;
   an end-point terminal management unit for requesting and receiving a list of end-point terminals that can be connected to the mobile communication terminal from the CPNS server, or extracting a list of previously stored end-point terminals that can be connected to the mobile communication terminal, and providing the end-point terminal list so that the user may recognize;
   a contents management unit for requesting and receiving contents that are played back at a time point of generating a contents transfer request from the CPNS server; and
   a contents transmission unit for transmitting the contents received by the contents management unit to an end-point terminal selected by the user from the end-point terminal list.

2. The mobile communication terminal according to claim 1, wherein if the contents are stored in the mobile communication terminal, the contents management unit extracts the previously stored contents and transmits the extracted contents to the end-point terminal selected by the user through the contents transmission unit.

3. The mobile communication terminal according to claim 1, wherein the contents transfer request key is a special key provided on the mobile communication terminal or a specific key on a keypad.

4. A contents providing system for providing data services through a short-range wireless communication network, the system comprising:
   a Converged Personal Network Service (CPNS) server for registering information on an end-point terminal as connection history information by matching the end-point terminal information to a corresponding mobile communication terminal when the end-point terminal is initially connected to the mobile communication terminal through the short-range wireless communication network, and providing response information if either an end-point terminal information request or a contents information request is received from the mobile communication terminal;
   the mobile communication terminal connected to at least any one of a plurality of adjacent end-point terminals through the short-range wireless communication network, for transmitting corresponding contents that are played back when a contents transfer request key signal is received to the end-point terminal, if the contents transfer request key signal is received while a mobile World Wide Web (WEB) or Wireless Application Protocol (WAP) service is used; and
   an end-point terminal for transmitting and receiving information to and from the mobile communication terminal through the short-range wireless communication network.

5. The system according to claim 4, further comprising a contents providing server for transforming a contents format based on a specification of the end-point terminal transmitted together with the contents request and transmitting the transformed contents to the CPNS server, or transmitting corresponding contents to the mobile communication terminal using a mobile communication terminal number matching to the end-point terminal after acquiring the mobile communication terminal number from the CPNS server, if the contents request is received from the CPNS server.

6. The system according to claim 4, wherein the end-point terminal includes:
   a communication interface unit for communicating with the short-range wireless communication network;
   an input unit for receiving a corresponding signal depending on a user's selection;
   a contents request and receive unit for requesting specific contents from the mobile communication terminal and receiving corresponding contents through the communication interface unit;
   a playback unit for playing back the received contents; and
   a storage unit for storing information related to the end-point terminal.

7. The system according to claim 5, wherein the end-point terminal includes:
   a communication interface unit for communicating with the short-range wireless communication network;
   an input unit for receiving a corresponding signal depending on a user's selection;
   a contents request and receive unit for requesting specific contents from the mobile communication terminal and receiving corresponding contents through the communication interface unit;
   a playback unit for playing back the received contents; and
   a storage unit for storing information related to the end-point terminal.

8. A Converged Personal Network Service (CPNS) server comprising:
   a communication interface unit for communicating with a mobile communication network;
   a mobile communication terminal information management unit for registering and managing information on the mobile communication terminal communicating with an end-point terminal through a short-range wireless communication network in a database;
an end-point terminal information management unit for registering and managing information on the end-point terminal transmitting and receiving information to and from the mobile communication terminal through the short-range wireless communication network in the database;
a history information management unit for collecting information on a connection established between the mobile communication terminal and the end-point terminal and storing and managing the collected information in the database as connection history information;
a contents request and provide unit for requesting and receiving corresponding contents from a contents providing server based on contents identification information transmitted together with a contents request, if the contents request is received from the mobile communication terminal;
an end-point terminal information providing unit for extracting and providing a list of end-point terminals that can be connected to the mobile communication terminal from the database in response to a request received from the mobile communication terminal; and
the database for storing information related to the CPNS server including the mobile communication terminal information and the end-point terminal information.

9. The CPNS server according to claim 8, wherein when the contents request and provide unit requests contents from the contents providing server, the contents request and provide unit provides hardware and software specifications of the end-point terminal together with a contents name so that the contents can be selectively provided in a format that can be played back and displayed on the end-point terminal or the contents can be transformed into a format that can be played back and displayed.

10. The CPNS server according to claim 8, wherein the information on the mobile communication terminal includes information required to communicate with the end-point terminal, such as an agreement state indicating whether or not to transmit and receive information to and from the end-point terminal through the short-range wireless communication network, a list of provided services, and a list of connected end-point terminals, and the information on the end-point terminal includes information required to provide the contents through the short-range wireless communication network, such as hardware and software specifications.

11. The CPNS server according to claim 9, wherein the information on the mobile communication terminal includes information required to communicate with the end-point terminal, such as an agreement state indicating whether or not to transmit and receive information to and from the end-point terminal through the short-range wireless communication network, a list of provided services, and a list of connected end-point terminals, and the information on the end-point terminal includes information required to provide the contents through the short-range wireless communication network, such as hardware and software specifications.

12. A method for providing data services through a short-range wireless communication network in a contents providing system including a Converged Personal Network Service (CPNS) server, a mobile communication terminal and an end-point terminal, in which contents are transferred to the end-point terminal while a mobile World Wide Web (WEB) or Wireless Application Protocol (WAP) service is used, the method comprising the steps of:
  a) allowing the mobile communication terminal to recognize a key selection as a request for transferring the contents and request a list of end-point terminals that can be connected to the mobile communication terminal from the CPNS server, if a contents transfer request key is selected while the mobile WEB or WAP service is used;
  b) allowing the CPNS server to extract and transmit the end-point terminals that can be connected to the mobile communication terminal from previously stored information, in response to a contents and end-point terminal list request transmitted from the mobile communication terminal;
  c) allowing the CPNS server to request corresponding contents from the contents providing server by transmitting a contents transfer request together with information on a specification of the corresponding end-point terminal, if information on an end-point terminal selected by a user from the end-point terminal list is received from the mobile communication terminal; and
  d) allowing the contents providing server to transmit contents that can be played back on the end-point terminal to the CPNS server considering the specification of the end-point terminal transmitted together with the contents request, or transmit corresponding contents to the mobile communication terminal using a mobile communication terminal number matching to the end-point terminal after acquiring the mobile communication terminal number from the CPNS server, if the contents request is received from the CPNS server.

13. The method according to claim 12, further comprising the step of, before step a), allowing the CPNS server to register information on the end-point terminal as connection history information by matching the end-point terminal information with the corresponding mobile communication terminal, when the end-point terminal is initially connected to the mobile communication through the short-range wireless communication network.

14. The method according to claim 12, further comprising the step of, after step d), allowing the CPNS server to receive a contents reception confirmation message transmitted from the end-point terminal through the mobile communication terminal, when the mobile communication terminal transmits the contents received from the CPNS server to the end-point terminal.

15. A method for providing data services through a short-range wireless communication network, in which a Converged Personal Network Service (CPNS) server connected to a mobile communication terminal and a contents providing server transfers contents to an end-point terminal while a mobile World Wide Web (WEB) or Wireless Application Protocol (WAP) service is used in response to a request received from the mobile communication terminal, the method comprising the steps of:
  a) allowing the CPNS server to register information on the end-point terminal as connection history information by matching the end-point terminal information with the corresponding mobile communication terminal, when the end-point terminal is initially connected to the mobile communication through the short-range wireless communication network;
  b) allowing the CPNS server to extract and transmit end-point terminals that can be connected to the mobile communication terminal from previously stored information, in response to a contents transfer request received from the mobile communication terminal;

c) allowing the CPNS server to request corresponding contents from the contents providing server, if information on an end-point terminal selected by a user from the end-point terminal list is received from the mobile communication terminal; and d) allowing the CPNS server to transmit the contents to a corresponding mobile communication terminal, if the contents are received from the contents providing server.

16. The method according to claim 15, further comprising the step of, after step a), collecting information on a connection established between the mobile communication terminal and the end-point terminal and additionally registering the collected connection information in the connection history information.

17. The method according to claim 16, wherein in step a), the CPNS server registers information on the mobile communication terminal required to communicate with the end-point terminal, such as an agreement state indicating whether or not to transmit and receive information to and from the end-point terminal through the short-range wireless communication network, a list of provided services, and a list of connected end-point terminals, and information on the end-point terminal required to provide the contents through the short-range wireless communication network, such as hardware and software specifications.

18. The method according to claim 16, wherein in step c), the CPNS server transmits hardware and software specifications of the end-point terminal together with a contents name so that the contents can be selectively provided in a format that can be played back and displayed on the end-point terminal or the contents can be transformed into a format that can be played back and displayed.

19. The method according to claim 15, wherein in step a), the CPNS server registers information on the mobile communication terminal required to communicate with the end-point terminal, such as an agreement state indicating whether or not to transmit and receive information to and from the end-point terminal through the short-range wireless communication network, a list of provided services, and a list of connected end-point terminals, and information on the end-point terminal required to provide the contents through the short-range wireless communication network, such as hardware and software specifications.

20. The method according to claim 15, wherein in step c), the CPNS server transmits hardware and software specifications of the end-point terminal together with a contents name so that the contents can be selectively provided in a format that can be played back and displayed on the end-point terminal or the contents can be transformed into a format that can be played back and displayed.

21. The method according to claim 15, further comprising the step of, after step d), allowing the CPNS server to receive a contents reception confirmation message transmitted from the end-point terminal through the mobile communication terminal, when the mobile communication terminal transmits the contents received from the CPNS server to the end-point terminal.

* * * * *